United States Patent
Li

(10) Patent No.: US 11,841,918 B1
(45) Date of Patent: *Dec. 12, 2023

(54) METHODS AND ARRANGEMENT FOR PREVENTING SPAM COMMENTS WITHOUT APPLICATION SPECIFIC CHANGES

(71) Applicant: Trend Micro Incorporated, Tokyo (JP)

(72) Inventor: Chia Li, Taipei (TW)

(73) Assignee: TREND MICRO INCORPORATED, Tokyo (JP)

( * ) Notice: Subject to any disclaimer, the term of this patent is extended or adjusted under 35 U.S.C. 154(b) by 763 days.

This patent is subject to a terminal disclaimer.

(21) Appl. No.: 16/554,211

(22) Filed: Aug. 28, 2019

Related U.S. Application Data

(63) Continuation of application No. 12/014,703, filed on Jan. 15, 2008, now abandoned.

(51) Int. Cl.
| | |
|---|---|
| *G06F 16/958* | (2019.01) |
| *G06F 21/54* | (2013.01) |
| *G06F 21/36* | (2013.01) |
| *G06F 40/174* | (2020.01) |
| *H04L 51/52* | (2022.01) |

(52) U.S. Cl.
CPC ............ *G06F 16/958* (2019.01); *G06F 21/36* (2013.01); *G06F 21/54* (2013.01); *G06F 40/174* (2020.01); *H04L 51/52* (2022.05)

(58) Field of Classification Search
CPC ...... G06F 16/958; G06F 40/174; G06F 21/54; G06F 21/36; H04L 51/52
See application file for complete search history.

(56) References Cited

U.S. PATENT DOCUMENTS

| 7,849,507 B1 * | 12/2010 | Bloch | H04L 63/168 726/22 |
| 2004/0122908 A1 * | 6/2004 | Konopka | H04L 63/0428 709/208 |
| 2008/0071884 A1 * | 3/2008 | Heithcock | G06F 9/4484 709/219 |
| 2019/0220576 A1 * | 7/2019 | Carnevale | G06F 21/14 |

OTHER PUBLICATIONS

Smith, Jared, "Spam-free accessible forms," Mar. 7, 2007, pp. 1-19. (Year: 2007).*

* cited by examiner

*Primary Examiner* — Kyle R Stork
(74) *Attorney, Agent, or Firm* — Beyer Law Group LLP

(57) ABSTRACT

A method for preventing spam comments from populating a web site is provided. The method includes intercepting a HTTP (Hypertext Transfer Protocol) response, which includes a web page with a form for enabling a client's general comments to be published on the web site. The method also includes modifying the web page with the form to create a modified web page with a randomized form. The modifying includes randomly adding a set of randomized variable names to the web page with the form. The set of randomized variable names is a set of randomly generated character strings. The method further includes forwarding the modified web page with the randomized form to the client. The method yet also includes adding the set of randomized variable name to a form database, which is configured for storing data about the modified web page with the randomized form.

11 Claims, 7 Drawing Sheets

| URL OF WEB PAGE | ORIGINAL VARIABLE NAME | RANDOMIZED VARIABLE NAME | COMMENT |
|---|---|---|---|
| https://www.mysites.com/comment.g?blogID=9386068&postID=646566297137514191 | session | dnsaihdu | |
| https://www.mysites.com/comment.g?blogID=9386068&postID=646566297137514191 | name | mnq98382q | |
| https://www.mycity.com/comment.g?ID=0396058&postID=461236627137141158 | comment | asniuiadj | |
| https://www.mycity.com/comment.g?ID=0396058&postID=461236627137141158 | | tehwelh32 | Added field |
| ... | ... | ... | ... |

METHODS AND ARRANGEMENT FOR PREVENTING SPAM COMMENTS WITHOUT APPLICATION SPECIFIC CHANGES

CROSS-REFERENCE TO RELATED APPLICATION(S)

The present application is a continuation of U.S. patent application Ser. No. 12/014,703, filed Jan. 15, 2008 entitled "Methods and Arrangement for Preventing Spam Comments Without Application Specific Changes" the disclosure of which is hereby incorporated by reference.

BACKGROUND OF THE INVENTION

The Internet has enabled millions of users worldwide to share information and interact with one another despite geographic dispersion. Millions of users, both personal and commercial users, have taken advantage of this new medium of communication to share ideas, thoughts, knowledge, and the like. Due to the Internet flexibility, the Internet has experienced double-digit growth.

Many of the web sites that populate the Internet have provided viewers with the ability to add comments and/or to add hyperlinks. In an example, viewers may add comments to commercial site bulletin boards or even to publicly available personal blog sites. The owners of the web sites have provided a forum by which viewers of the web sites may contribute to the websites for a plurality of reasons (e.g., enable the viewers to provide comments about the content of the web site, enable the viewers to have discussion with one another, and the like). However, the owners of the web sites rarely intended viewers to abuse the privilege by misusing the forums.

A form of abuse that has been popularly implemented is known as blog spam (i.e., spam comment), or abbreviated as blam. As discussed herein, blog spam refers to a posted comment that is a random comment and/or an advertisement for commercial products/services on a third party web site that allows user's generated content, such as comments and/or hyperlinks. Those skilled in the arts are aware that blog spam has been traditionally employed as a method of advertising and/or falsely increasing a web site search engine ranking.

A spammer may employ a bot program to automatically create blog spam. As discussed herein, a bot program refers to a software program that may be employed to automate a task. Since most bot programs are relatively inexpensive and are easily implemented, spammers have employed bot programs to complete and submit forms on web sites that enable user's generated content. Thus, a spammer may employ the bot program to easily access the different web sites on the Internet in order to enable self-promotion of the spammer's web site, products, and/or services. Spammers use bot programs because bot programs enable the spammers to spam a plurality of web sites within a very short period of time.

Blog spam has become a problem as many web sites are inundated with a plethora of blog spam from a plurality of spammers. To remove the blog spam, manual intervention may be required. Some web sites have elected to eliminate forums due to the time and resources required to remove the blog spam. Other web sites have implemented anti-blam techniques.

A popular anti-blam technique includes asking a series of questions. By accurately responding to the questions, the viewers are deemed to be human and the viewers may post comments. Examples of questions include (Completely Automated Public Turing test to tell Computers and Humans Apart) CAPTCHA (showing a set of alphanumeric characters within an image and requesting the viewer to type in the characters), math questions, and Asirra (showing a set of simple pictures and requesting the viewer to differentiate between the pictures). Web sites that implement this type of anti-blam technique are usually able to substantially minimize the number of blog spam posted.

Another anti-blam technique that may be implemented includes employing a blam filter to intercept comments. In other words, before a comment is posted to a web site, a blam filter may send the comment to a centralized spam database for analysis. If the comment is from a known spammer or if the comment is similar to another comment stored on the centralized spam database, the comment is deemed to be a blog spam and the comment is not added to the web site. Unfortunately, the centralized spam database is dependent upon outside contribution. In other words, the centralized spam database is usually populated with blog spam content voluntarily identified by Internet users. Since hundreds of new content are being added daily to the Internet, the centralized spam database is limited by how fast blog spam may be manually identified. Thus, the centralized spam database may not be a complete database of all possible blog spam.

There are several disadvantages to the current anti-blam techniques. First, the anti-blam techniques are only effective on web sites that implement the techniques. Thus, web sites that may have less resources available may not be able to take advantage of the anti-blam techniques that may be available. Even if a web site may have implemented an anti-blam technique, the spammers are constantly devising new spamming methods. Hence, an anti-blam technique that may have been previously effective may lose it effectiveness when new spamming methods are employed. Since most web site owners do not have the time and/or resources to constantly update the anti-blam techniques on the web sites, many web sites anti-blam prevention techniques may be outdated and quite ineffective.

BRIEF SUMMARY OF THE INVENTION

The invention relates, in an embodiment, to a method for preventing spam comments from populating a web site. The method includes intercepting a HTTP (Hypertext Transfer Protocol) response, which includes a web page with a form for enabling a client's general comments to be published on the web site. The method also includes modifying the web page with the form to create a modified web page with a randomized form. The modifying includes randomly adding a set of randomized variable names to the web page with the form. The set of randomized variable names is a set of randomly generated character strings. The method further includes forwarding the modified web page with the randomized form to the client. The method yet also includes adding the set of randomized variable name to a form database, which is configured for storing data about the modified web page with the randomized form.

The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which:

FIGS. 5A and 5B show, in an embodiment of the invention, simple examples of form databases.

DETAILED DESCRIPTION OF EMBODIMENTS

Figure 1:
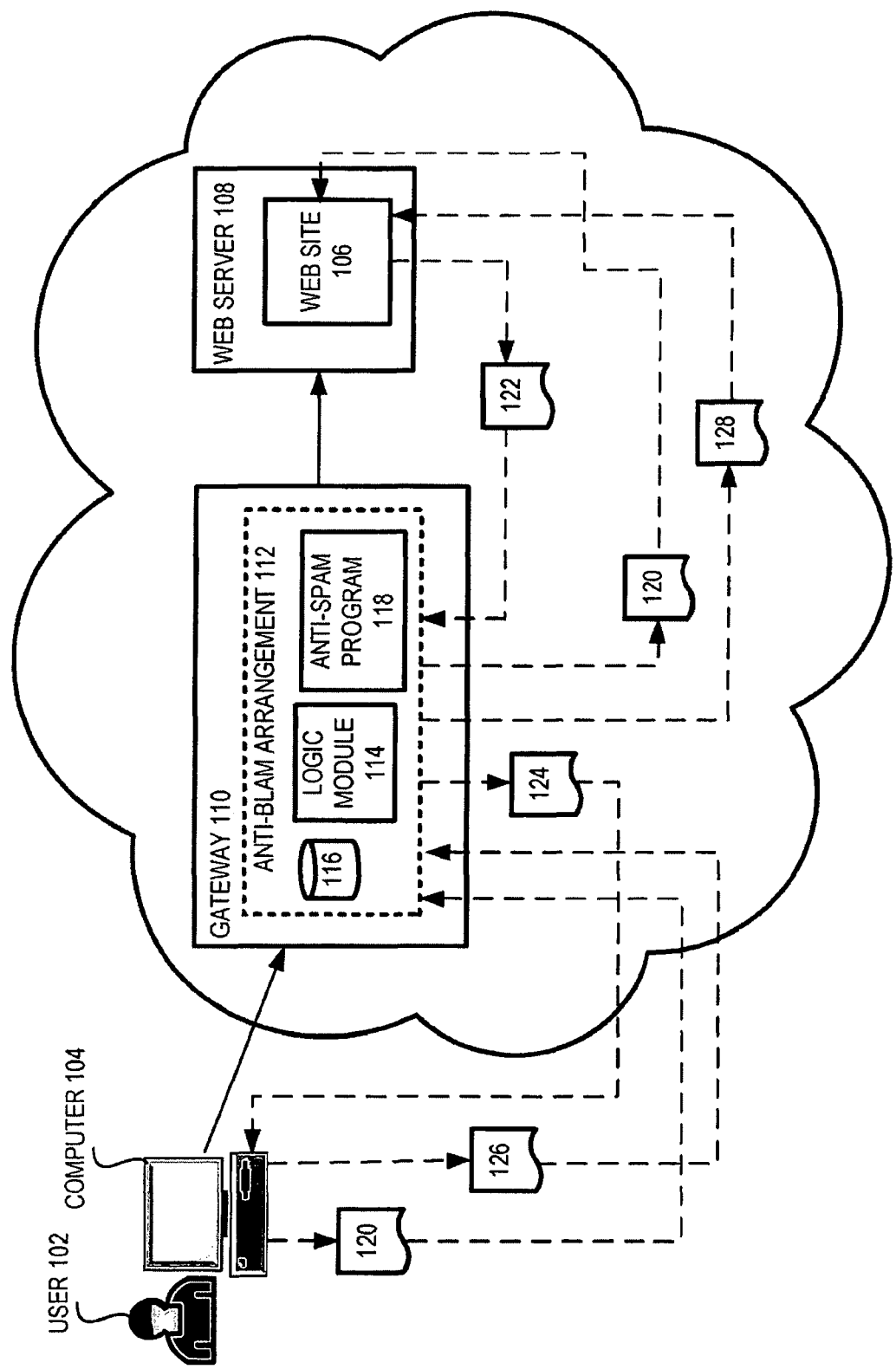
FIG. 1 shows, in an embodiment of the invention, a simple overall architectural diagram of an anti-blam arrangement.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

As aforementioned, many web sites allow viewers to contribute to the web sites by adding comments and/or hyperlinks. In order to add the comments, a viewer may complete and submit a form. However, not all comments on the web sites are related to the web sites. Instead, some of the comments, known as blog spam (i.e., spam comments), are unrelated to the content on the web sites and many are advertisements or hyperlink to commercial sites. Usually, blog spam may be automatically posted by employing bot programs.

Since most forms tend to require similar type of information (e.g., name, address, email, telephone number, comments, etc) to be provided, many of the bot programs have been programmed to be able to provide acceptable character strings in response to the different possible data fields that a form may require. In one aspect of the invention, the inventor herein realized that bot programs may be prevented from spamming web sites if the bot programs are unable to complete the forms. In accordance with embodiments of the present invention, an anti-blam arrangement and methods are provided for preventing a bot program from populating a web site with blog spam. Embodiments of the invention include creating randomized variable names. Embodiments of the invention also include applying anti-Warn programs to determine whether a form include blog spam.

In one or more embodiments of the invention, the anti-blam arrangement may be implemented within a gateway and/or an internet protocol (IP) server. In an embodiment, the anti-blam arrangement may include a logic module, a form database, and a set of anti-blam programs. In this document, various implementations may be discussed using gateway as an example. This invention, however, is not limited to gateway and may include any network node to another network (e.g., web server. IP server, etc). Instead, the discussions are meant as examples and the invention is not limited by the examples presented.

Consider the situation wherein, for example, a user wants to add a comment to web page A. The user may employ his computer (client) to send an HTTP request to a web server requesting for a web page with a form (such as an HTML form) to be sent to the user in order for the user to add comment to the web page. The web server hosting the web page may send an HTTP response, which may include a web page with a form. Nate that the web page may include more than one web form. However, to facilitate discussion, the example is provided with a single web form.

In an embodiment, a logic module at a gateway may intercept the HTTP response. In an embodiment, the logic module may be configured to check the HTTP response to determine if the HTTP response includes a web form. If the HTTP response includes a web form (such as an HTML form), the logic module is configured to randomize at least one of the variable names associated with the form. In an example, the web page with form may include a variable name "address". The logic module may change the variable name "address" to variable name "athe135jer". By randomizing the variable names, the bot program is unable to complete the form since the bot program may be unable to understand the randomized variable name.

In an embodiment, data about the web page with the form may be stored in a form database. Examples of data type may include, but are not limited to, URL (uniform resource locator) of the HTTP request, the variable names that has been randomized, the randomized names associated with the variable names, and the like.

Although the logic module is configured to change the variable names, the randomized variable names may only affect the script of the web page. The tag names of the web page with form as displayed have not been altered. In other words, the change to the variable names is transparent to the human viewers since the physical appearance of the web form has not changed.

As can be appreciated from the foregoing, by randomizing the variable names, the anti-blam arrangement may create a new web page with a unique source code each time a web page with a form is generated. Thus, even if the same web page from the same web site is being generated, each version of the web page is unique since the variable names are being randomly altered each time. Since the variable names are randomized, the bot programs are unable to anticipate the variable names. Therefore, the bot programs are unable to "fill out the form" since the bot programs are not configured to handle the randomized variable names.

In another embodiment, the logic module may also be configured to intercept an HTTP request. An HTTP request may be sent initially by the user's computer to request for a web page with a form (such as an HTML form). Those skilled in the art are aware that most initial HTTP request usually includes the URL of the requested web page. Usually, the initial HTTP request does not include variable names that may be associated with the web form on the web page.

Upon intercepting the HTTP request, the logic module may compare the URL of the web page within the HTTP request against a form database. If the URL is not stored in the form database, the HTTP request is probably an initial request for a web page with web form. In an embodiment, the gateway is configured to forward the HTTP request to the web server hosting the web page.

However, if the URL of the web page is already stored in the form database, then the logic module may check the HTTP request to determine if variable names have been sent in the HTTP request; in an embodiment. Note that sometime a web form (such as an HTML form) of a web page may be generated more than once. In an example, a First copy of the web page with a form may have been sent to user A with randomized web form. A little while later, user B may send a request for the same web form. Upon intercepting the HTTP request from user B, the logic module may compare the URL of the requested web page to the form database. Since the request from user A and the second request from user B have the same URL; the logic module may perform an additional comparison to determine whether or not the second copy of the web page has been randomized.

In an embodiment, the logic module may be configured to check the HTTP request to determine if variable names have been sent in the HTTP request. Usually, the initial HTTP request that a user's computer (client) may send to request for a web form may only include the URL of the requested web page. If no variable name is identified, then the HTTP request is an initial HTTP request. Hence, the gateway may forward the HTTP request to the web server hosting the web page.

However, if the HTTP request is not an initial HTTP request then the HTTP request may include variable names. Consider the situation wherein, for example, user A has completed the web form and has sent the web form back to be uploaded onto the web page. In other words, user A's computer sends an HTTP request. Unlike the initial HTTP request, this HTTP request may include a set of variable names.

Accordingly, an HTTP request may be a legitimate request from a user; however, an HTTP request may also be coming from a bot program trying to upload blam onto a webpage. In an embodiment, the logic module may be configured to check the content of the HTTP request before forwarding the HTTP request to the web server hosting the web page. In an example, the gateway may compare the variable names on the HTTP request against the variable names saved on the form database. If the variables names do not match the randomized variable names, but instead match the original names associated with the web page, the logic module may consider the HTTP request to be compromised with blam and may discard the HTTP request. In other words, the HTTP request may be from a bot program unaware of the randomization method being applied in preventing the blam. Note that discussion about randomization is provided later in the figure discussion.

Upon encountering the variable names, the anti-blam arrangement may scan the request to determine if the request includes blog spam. In an embodiment; the anti-blam arrangement may include a set of anti-blam programs. In one aspect of the invention, the inventor herein realized that by implementing anti-blam programs at the gateway, the anti-blam programs may be applied to any web page that may traverse through the gateway. Unlike the prior art, each web page that traverses through the gateway is protected against potential blog spam since the gateway may employ a plurality of anti-blam programs to scan the web page for potential blog spam. Hence, even if a web site has not implemented any anti-blam technique or if the anti-blam technique is outdated, the web site is still protected against potential blog spam since the anti-blam scanning is now being performed at the gateway level. In an example, the anti-blam arrangement may scan the completed scan web page to determine if the web page has an IP address of a known spammer. In another example, the anti-blam arrangement may employ blam filter to determine if the completed form include content that may be similar to the content in a centralized database of known blog spam.

In an embodiment, the logic module may have added anti-blam features onto the web page when the web page has been randomized. In an example, the logic module may have added additional form items requiring the user to respond to a series of question such as CAPTCHA, math questions, and/or Asirra. As aforementioned, the series of questions are usually an effective method of differentiating a human user from a bot program since the series of question method usually requires the user to provide a response based on a set of randomly generated images and/or questions.

If the anti-blam arrangement determines that the HTTP request include blog spam, then the anti-blam arrangement may discard the HTTP request, in an embodiment. Thus, the blog spam is prevented from populating the unsuspecting web site. With the anti-blam arrangement, web sites may benefit from anti-blam programs even if the web sites have not integrated anti-blam functions onto their web sites. Hence, the anti-blam arrangement substantially eliminates the need for the owner of the web sites to spend additional time and resources to identify and eliminate blog spam.

However, if the anti-blam arrangement identifies the HTTP request as being free from blog spam, the logic module is configured to modify the HTTP request back to its original structure, in an embodiment. The logic module may perform this action by replacing the set of randomized variable names with the set of original variable names. In addition, if additional form fields have been added then the logic module is also configured to remove the additional form fields.

The features and advantages of the present invention may be better understood with reference to the figures and discussions that follow.

FIG. 1 shows, in an embodiment of the invention, a simple overall architectural diagram of an anti-blam arrangement. In an embodiment anti-blam arrangement 112 may include a logic module 114, a form database 116, and a set of anti-blam programs 1:18.

Logic module 114 may be a set of code configured to analyze incoming HTTP requests and HTTP responses. Those skilled in the art are aware that HTTP requests and HTTP responses are methods for a client (such as a user's computer) and a web server to interact with one another. Usually, a client may send a request (e.g., request for a web page to be sent, request to update a web page, etc.) to a web server 108, which is usually configured for handling the request from the client (e.g., creating the requested web page, storing the data sent by the client, deleting a web page, etc.).

In an embodiment, anti-blam arrangement 112, which is positioned within a gateway 110, for example, may be configured to intercept HTTP requests and HTTP responses. If an HTTP request is intercepted, such as HTTP request 120 or HTTP request 126, logic module 114 may be configured to analyze the HTTP request to determine if the HTTP request is not randomized. If the HTTP request is not randomized, anti-blam arrangement 1:12 may be configured to forward the HTTP request to web server 108. However, if the HTTP request is randomized, then logic module 114 is configured to remove the randomized variables and transform the randomized web page back into its original format. In an embodiment, if an HTTP response is intercepted, such as HTTP response 122, then logic arrangement 11.4 may be configured to convert the web page with a form within HTTP response 122 into a modified web page with randomized variable names in order to prevent the bot program from being able to accurately complete the web form.

In an embodiment, anti-blam arrangement 112 may also include form database 116. Form database 116 is configured to store data about web pages that have been randomized. Examples of data stored in form database 116 includes but are not limited to, URL of a web page within an HTTP request, the set of variable names that has been randomized, the randomized names associated with the set of variable names, and the like.

In an embodiment, more than one copy of a URL of a web page may be stored within form database 116. In an example, a first user may have requested for a web page A with a form. Web page A may be randomized and forwarded to the first user. A little while later, a second user may request for the same HTML form. When the second copy of the web form is randomized, the URL of the web page is again saved onto from database 116. However, the set of randomized variables is unique in that the first set of randomized variables associated with the web page requested by the first user is different than the set of randomized variables requested by the second user. By keeping the set of randomized variables unique, anti-blam arrangement 112 is able to keep track of the different versions of the same HTML form.

In an embodiment, data stored about a URL may be deleted when an HTTP response is received and the web page has either been discarded or un-randomized and forwarded to the designated web server. In an embodiment, the data may also be discarded after a corresponding HTTP request is not received after a designated time. By deleting the row of unnecessary data, anti-blam arrangement 112 is able to minimize the memory size needed for supporting form database 112. Also, by removing unnecessary data, form database 112 is lean and processing may occur faster since less data may have to be processed.

In an embodiment, anti-blam arrangement 112 may include a set of anti-blam programs 118. By installing set of anti-blam programs 118 at gateway 110, set of anti-blam programs 118 may be applied to all web pages that traverse through gateway 110. Unlike the prior art, web sites that have not implemented anti-blam program or may not have updated anti-blam programs are no longer at a disadvantage. Instead, set of anti-blam programs 118 at gateway 110 not only enables web pages to be analyzed by the most recent anti-blam programs but also prevent blog spam from populating a web site. Thus, the resources a web site may have allocated for identifying and/or removing blog spam may be reallocated.

Figure 2:
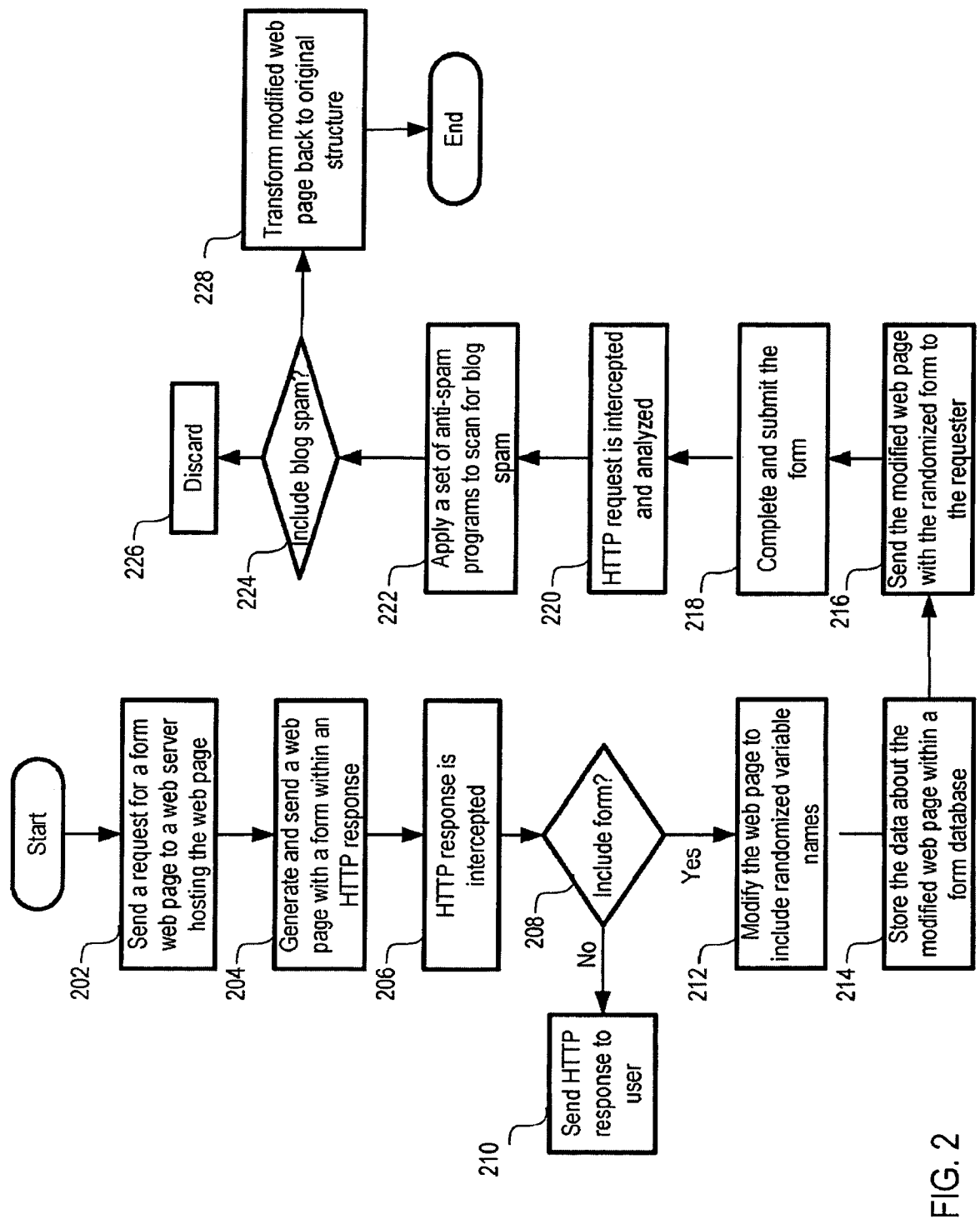
FIG. 2 shows, in an embodiment of the invention, a flow chart for implementing an anti-blam arrangement.

To illustrate how anti-blam arrangement 112 may be applied, FIG. 2 shows, in an embodiment of the invention, a simple flow chart for implementing an anti-blam arrangement. FIG. 2 is discussed in relation to FIG. 1.

At a first step 202, a client may send a request for a web page with a form to a web server hosting the web site. In an example, user 102 at computer 104 (i.e., client) may employ a browser and click on a link to a form. The click on the link may activate a web page with an HTTP request; such as "GET/comment.php", for example.

A ta next step 204, the web page with the form is generated and sent within an HTTP response by the web server. In an example, HTTP response 122 is sent by web server 108. The web page that is sent by web server 108 is an unmodified web page with a set of original variable names (variable names that have not been altered).

At a next step 206, the web page is intercepted by a gateway.

In an embodiment, the gateway may include an anti-blam arrangement, which may be configured to analyze the web page. At a next step 208, the anti-blam arrangement may check the web page to determine if a web form is available.

If a web form is not available, then at a next step 210, the web page is forwarded to the client.

However, if a web form is available, then at a next step 212, the anti-blam arrangement may randomize the set of original variable names.

Figure 5B:

At a next step, 214, the data about the web page is saved onto a form database. Data saved may include, but are not limited to the URL of the web page, the set of original variable names, and the set of randomized variable names. In an embodiment, the URL of the web page may change if an "action" has been randomized. Refer to FIG. 5B for further details.

At a next step 216, the modified web page with the randomized web form is sent to the client.

Upon receiving the modified web page, the client may complete the web form and submit the web form to the web site as a HTTP request, at a next step 218.

At a next step 220, the HTTP request may be intercepted by the gateway and analyzed by the anti-blam arrangement.

At a next step 222, the anti-blam arrangement is configured to apply a set of anti-blam programs to the HTTP request to scan for blog spam.

At a next step 224, the anti-blam arrangement may make a determination on whether or not the HTTP request includes blog spam.

If the HTTP request includes blog spam, then at a next step 226, the HTTP request may be discarded, thereby preventing the blog spam from populating the unsuspecting web site.

However, if the HTTP request does not include blog spam, then at a next step 228, the anti-blam arrangement may replace the set of randomized variable names with the set of original variable names, thereby transforming the modified web page back to its original structure before sending the non-randomized HTTP request to the intended web site.

As can be appreciated from FIG. 2, the anti-blam arrangement and the methods thereof provide an effective solution for minimizing the proliferation of blog spam. Details on how the anti-blam arrangement may be applied to handle HTTP responses and HTTP requests are provided below in FIGS. 3 and 6, respectively.

Figure 3:
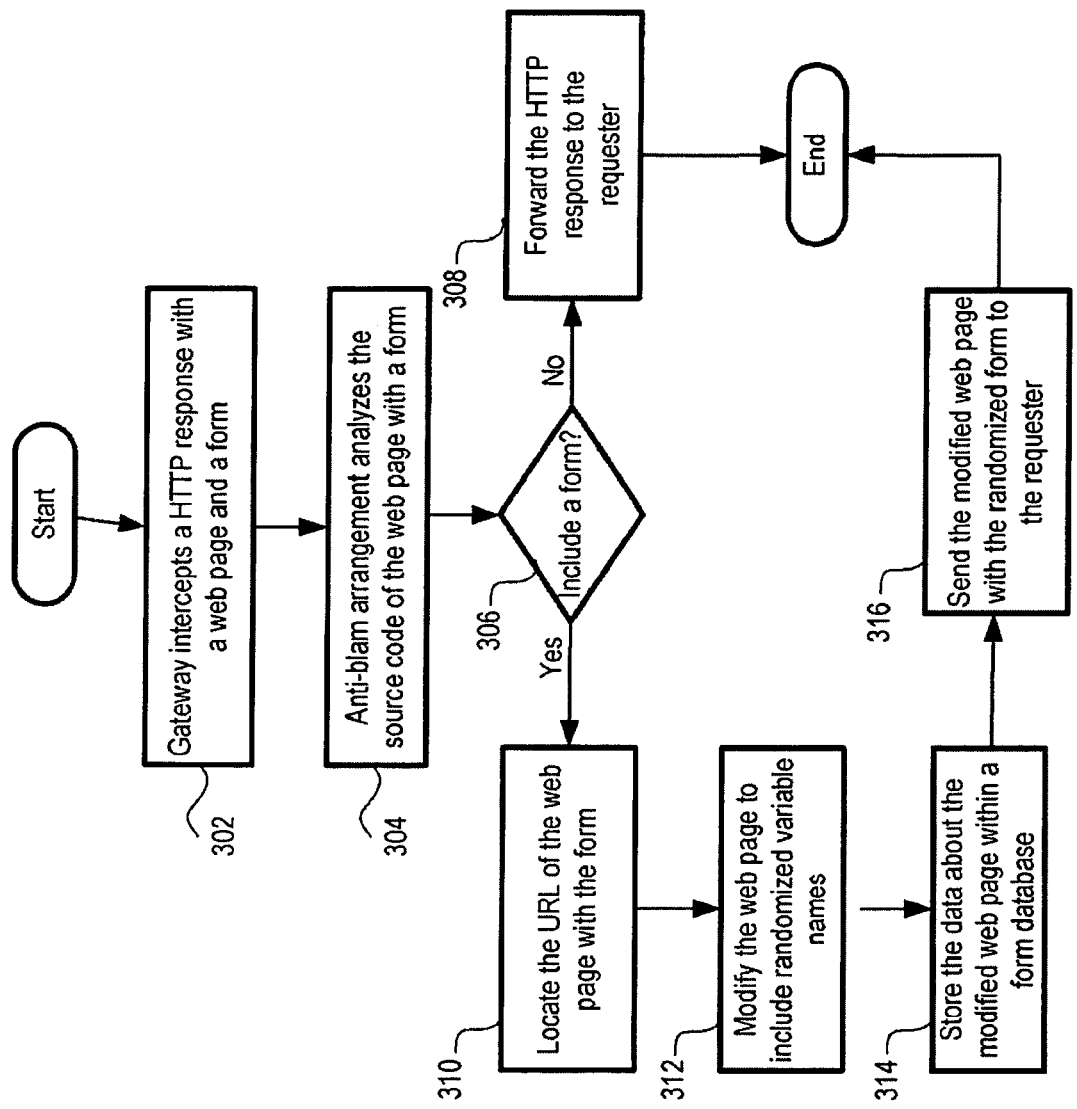
FIG. 3 shows, in an embodiment of the invention, a simple flowchart illustrating the steps for performing randomization when a web page with a form is received by an anti-blam arrangement.

Those skilled in the art are aware that randomization is a well-known technique. The application of the randomization technique can vary in the invention and is not limited by the examples given below. FIG. 3 shows, in an embodiment of the invention, a simple flowchart illustrating the steps for performing randomization when a web page with a web form (such as an HTML form) is received by an anti-blam arrangement.

At a first step 302, a gateway intercepts a HTTP response with a web page and a web form. In an example, HTTP response 122 is intercepted by gateway 110. In an embodiment, the interception may be performed by anti-blam arrangement 112. Unlike the prior art, anti-blam arrangement 112 at gateway 110 may intercept web page 108 in order to modify the web page with the web form within HTTP response 122 and create a modified web page with a randomized web form that may be employed to identify blog spam.

At a next step 304, the anti-blam arrangement may analyze the source code of the web page. In an embodiment, the anti-blam arrangement may include a logic module configured to perform the analysis. In an example, anti-blam arrangement 112 may include logic module, 114.

At a next step 306, logic module 114 may check HTTP response 122 to determine if the web page includes a web form (such as an HTML form).

If a form is not included, then at a next step 308, HTTP response 122 is forwarded to user 102 at computer 104.

However, if a web form is identified, then at a next step 310, logic module 114 may identify the URL of the web page within HTTP response 122.

At a next step 312, logic module 114 may modify the web page by altering the set of original variable names associated with the web form to a set of randomized variable names. In an embodiment, logic module 114 may be configured to randomize at least one variable name of the set of original variable names associated with the web form. As can be appreciated from the foregoing, the number of variable names that may be randomized may depend upon the preference of the programmers. However, even if only one variable name is altered, the single randomized variable name is sufficient to confuse the bot programs and to provide the anti-blam arrangement with sufficient data to identify potential blog spam.

Figure 4A:
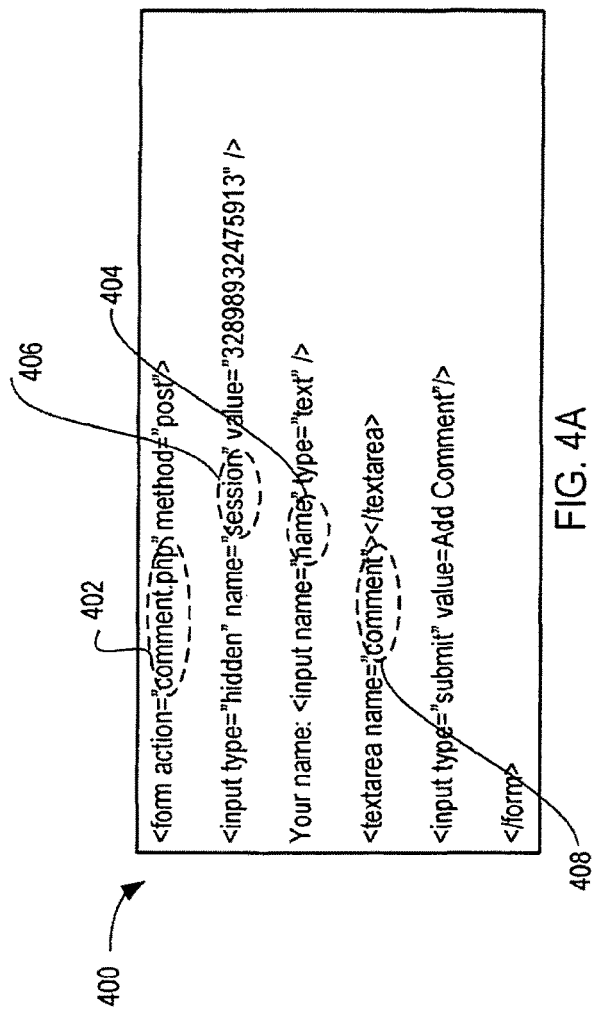
FIG. 4A shows an example of a partial source code for a web page with a web form before randomization has occurred.
Figure 4B:
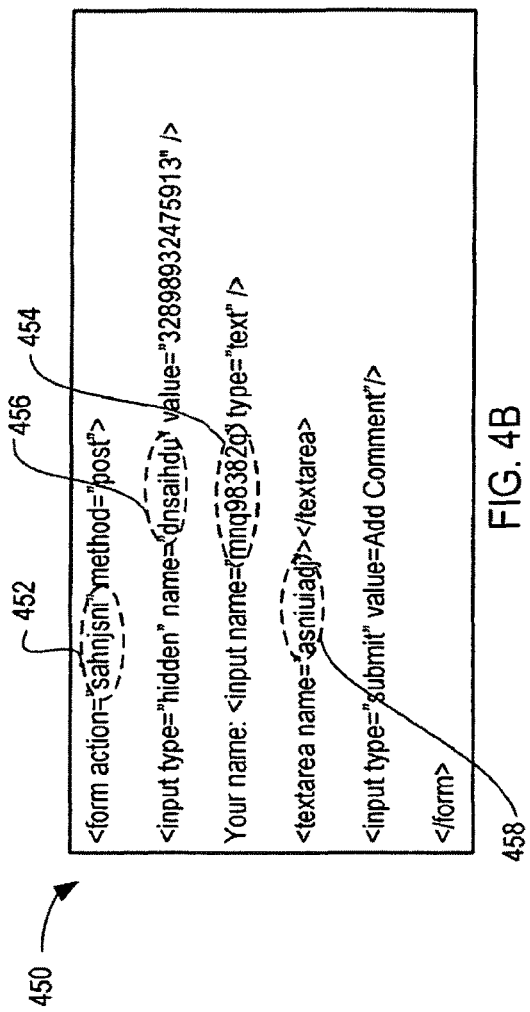
FIG. 4B shows, in an embodiment, an example of a partial source code of a randomized web form.

In an embodiment, randomization may include changing the set of original variable names associated with the form. To illustrate, FIGS. 4A and 4B show an example of a partial source code. FIG. 4A, shows an example of a partial source code 400 for a web page before randomization has occurred. Meanwhile, FIG. 4B shows, in an embodiment, an example of a partial source code 450 of a modified web page with a randomized form. As can be seen, FIG. 4B is a randomized version of FIG. 4A.

In an example, variable name 404 (name) has been altered to variable name 454 (mnq98382q). In another example, variable names 406 (session) and 408 (comment) have been altered to variable names 456 (dnsaihdu) and 458 (asniui-adj), respectively. The randomized variable name that may be created is based on a random generator. As can be appreciated from the foregoing, the length of the randomized variable name may vary and the randomized variable name may include characters, numbers, symbols, and the like. Thus, the likelihood that a bot programs may be able to identify all the possible variation is highly unlikely. Even if all possible variations may be determined, the bot program is unlikely to be able to determine the relationship between the set of randomized variable names and the set of original variable names.

In an embodiment, the logic module may also alter the web page by adding additional fields to the web form. In an example, the original web page with the web form may have five fields on the web form. However, the logic module may have added three additional fields to the web form. The three additional fields may be associated with variable names that have been randomized, thereby preventing the bot programs from being able to accurately complete the web form.

In an embodiment, the additional fields added to the web form may integrate anti-blam techniques. In an example, the additional fields may ask a series of questions. Some of the questions may be associated with random images (such as CAPTCHA, math questions, and/or Asirra) that may be displayed and may require the user to complete the web form based on the displayed images. As can be appreciated from the foregoing, by adding additional randomized field onto the form, the anti-blam arrangement may include a method for identifying blog spam without altering the original variable names.

Referring back to FIG. 3, at a next step 314, the data about the modified web page is stored within a form database. In an embodiment, the form database may be configured to store data about web pages that have been altered.

FIG. 5A shows, in an embodiment of the invention, a simple example of a form database 500. Form database 500 may include a plurality of data, including but are not limited to, URL of the web page with a form, original variable name, randomized variable name, comments, and the like. In an example, rows 504, 506, and 508 show the original variable names and the randomized variable names that have been changed in FIGS. 4A and B. Randomized variable names associated with fields that have been added to a form of a modified web page may also be added to the form database, in an embodiment. However, the randomized set of variable names (such as row 510) is not associated with any original variable name. In an embodiment, the data related to a modified web page with a form may be deleted when the web page has been transformed back to the original form.

In this document, various implementations may be discussed using variable name as an example. This invention, however, is not limited to variable names and may include other HTML tags, such as actions, that a webpage source code may include. Instead, the discussions are meant as examples and the invention is not limited by the examples presented.

In an example, action 402 (comment.php) of FIG. 4A has been randomized and changed to action 452 (sahnjsni) of FIG. 4B. In an embodiment, if an "action" is randomized, then the URL of the web page may also be changed. The URL of the webpage may be changed as shown in form database 550 of FIG. 5B. In an example, the URL of the web page (column 552) has been changed.

https://www.mysites.com/
comment.g?blogID=9386068&postID=646566297137514191 (before)
https://www.mysites.com/sahnjsni (after)

Referring back to FIG. 3, at a next step 316, the modified web page with the randomized form (as a HTTP response 124) is sent to user 102 at computer 104.

As can be appreciated from the foregoing, the randomization that has been applied to the web page is transparent both to the user and the parent web site. The modification is intended to confuse the bot programs and to prevent the bot programs from accurately completing the form, thereby providing a signature that the anti-blam arrangement may be able to apply in identifying blog spam.

Figure 6:
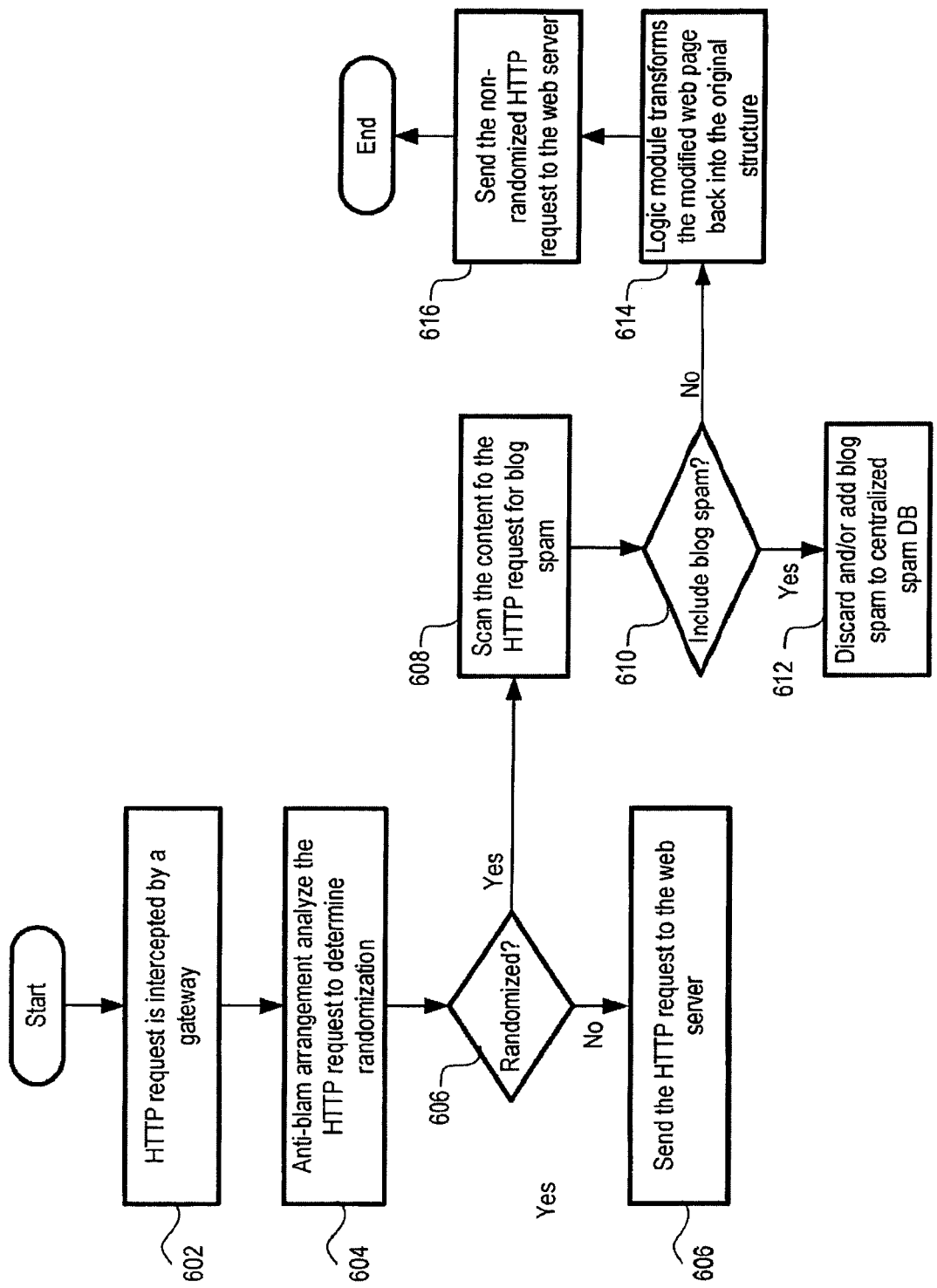
FIG. 6 shows, in an embodiment of the invention, a simple flowchart illustrating the steps for handling a HTTP (Hypertext Transfer Protocol) request based on randomized web form.

FIG. 6 shows, in an embodiment of the invention, a simple flowchart illustrating the steps for handling form data for a modified web page with a randomized form. FIG. 6 is discussed in relation to FIG. 1.

At a first step 602, an HTTP request is intercepted by a gateway.

As can be appreciated from the foregoing, different types of HTTP requests may be intercepted by the gateway. In an example, the HTTP request, such as HTTP request 120, may be a request for a web page to be generated. Those skilled in the art are aware that this type of HTTP request usually includes the URL of the requested web page but not any of the variable names that may be associated with an HTML. However, an HTTP request, such as HTTP request 126, may be a request to have data posted onto a web site. Thus, the HTTP request may not only include the URL of the targeted web page but also the set of variable names and/or the responses associated with the set of variable names. Thus, depending upon the type of HTTP request, the HTTP request may be handled differently.

At a next step 604, an anti-blam arrangement may employ a logic module to analyze the HTTP request to determine if the HTTP request has been randomized. In an embodiment, logic module 114 may compare the URL of the web page within the HTTP request against the data stored within form database 116.

If the URL is not stored in the form database, then the web page has not been randomized. At a next step 606, the HTTP request may be forwarded to the web server hosting the web page. In an example, HTTP request 120 is forwarded to web server 108.

However, lithe URL is stored in the form database, then the logic module may perform further analysis on the HTTP request. Since more than one copy of a web page may be generated, the URL of the web page may already be stored in the form database. To determine if the HTTP request is a request for a web page to be generated or to determine if the web page is a completed web form with data to be posted, the logic module may be configured to check the HTTP request for a set of variable names. If the HTTP request does not include a set of variable names or if the set of variable names is not stored in the form database, the HTTP request is considered as being non-randomized and is forwarded to the web server at step 606.

However, if the HTTP request includes a set of variable names that is stored within the form database, then the web page has been randomized. At a next step 608, the anti-blam arrangement may scan the content of the HTTP request for blog spam. In an embodiment, the anti-blam arrangement may activate the set of anti-blam programs that may be positioned within the gateway. Unlike the prior art, new anti-blam programs may be implemented at the gateway level and provide protection to a plurality of web sites. As can be appreciated from the foregoing, by placing the anti-blam programs at the gateway level, the gateway is able to provide anti-blam protection to web sites that may not include anti-blam programs or may not have updated the anti-blam program to address new types of blog spam.

At a next step 610, the anti-blam arrangement may make a determination on the likelihood of the HTTP request being infected by blog spam.

If the HTTP request includes blog spam, then at a next step 612, the anti-blam arrangement may discard the HTTP request. In an embodiment, the blog spam may be sent to a centralized spam database that is configured to store data about blog spam. As aforementioned, by performing the scanning at the gateway level, blog spam may be identified and discarded before being posted to the web site. As a result, time and resources allocated to identify and removing blog spam may be significantly eliminated/minimized.

However, if the HTTP request is free of blog spam, then at a next step 614 the logic module may transform the modified web page with the randomized web form back into the original web page. In an example, the randomized variable names may be replaced by the original variable names. In another example, the additional fields may be removed. In an embodiment, if a variable name is listed as a randomized variable name but is not associated with an original variable name, the logic module is configured to delete the code related to the randomized variable name since the lack of an original variable name is an indication to the logic module that the code associated with the randomized variable name is not part of the original form structure and has been added by the logic module.

At a next step 616, the non-randomized HTTP request (HTTP request 128) is forwarded to web site 106 at web server 108.

As can be appreciated from the forgoing, one or more embodiments of the present invention provide for an anti-blam arrangement for preventing spammers from populating unsuspecting web sites with spam comments. With the present invention, the number of blog spam that may go undetected may be substantially eliminated. Since the anti-blam arrangement is being implemented at a gateway and/or an IP server, the time and resources that an individual web site may allocate to the task of managing blog spam may be substantially minimized.

While this invention has been described in terms of several preferred embodiments, there are alterations, permutations, and equivalents, which fall within the scope of this invention. Although various examples are provided herein, it is intended that these examples be illustrative and not limiting with respect to the invention.

Also, the title and summary are provided herein for convenience and should not be used to construe the scope of the claims herein. Further, the abstract is written in a highly abbreviated form and is provided herein for convenience and thus should not be employed to construe or limit the overall invention, which is expressed in the claims. If the term "set" is employed herein, such term is intended to have its commonly understood mathematical meaning to cover zero, one, or more than one member. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method for preventing spam comments from populating a web site, the method comprising:
   intercepting a HTTP (Hypertext Transfer Protocol) response, said HTTP response including a web page with a form for enabling a client's general comments to be published on said web site;
   modifying said web page with said form to create a modified web page with a randomized form, said modifying including altering a set of original variable names of said web page with said form to a set of randomized variable names but not altering tag names of said web page that are associated with said set of original variable names, said set of randomized variable names comprising a set of randomly generated character strings;
   forwarding said modified web page with said randomized form to said client;
   adding said set of randomized variable names to a form database, said form database being configured for storing data about said modified web page with said randomized form;
   intercepting a HTTP request, said HTTP request including at least one of a URL (uniform resource locator) and said set of randomized variable names, wherein said HTTP request including a set of responses associated with said set of randomized variable names;
   scanning said HTTP request for said spam comments;
   if said HTTP request includes said spam comments, discarding said HTTP request;
   if said HTTP request does not include said spam comments, transforming said HTTP request by replacing said set of randomized variable names by said set of original variable names to create a non-randomized HTTP request and sending said non-randomized HTTP request to said web site,
   wherein said intercepting said HTTP request is performed by an anti-blam arrangement,
   wherein said anti-blam arrangement is implemented within a gateway,
   wherein said anti-blam arrangement is configured to include a logic module, said logic module including a set of code for performing at least one of analyzing and modifying at least one of said HTTP request and said HTTP response, and
   wherein said analyzing by said logic module including at least comparing a set of variable names in said HTTP request to said data about said modified web page with said randomized form stored on said form database, wherein if said set of variable names in said HTTP request is stored in said form database as said set of randomized variable names, said anti-blam arrangement is configured for at least activating a set of anti-blam programs for scanning said HTTP request for said spam comments.

2. The method of claim 1, wherein said data about said modified web page with said randomized form is configured to be deleted from said form database when said set of randomized variable names is replaced by said set of original variable names in said HTTP request.

3. The method of claim 2, wherein said modified web page is configured to integrate a set of anti-blam components.

4. The method of claim 3, wherein said set of anti-blam components includes logic for asking a set of questions based on a set of displayed images.

5. A computer comprising a processor and a memory, the memory storing program code that when executed by the processor causes the computer to:
   intercept a HTTP (Hypertext Transfer Protocol) response, said HTTP response including a web page with a form for enabling a client's general comments to be published on a web site;
   modify said HTTP response by altering an original variable name of said web page with said form to an altered variable name but not alter a tag name associated with said original variable name;
   store said altered variable name on a form database, said form database being configured to include data about said HTTP response;
   intercept a HTTP request, said HTTP request including said altered variable name, wherein said HTTP request including a response associated with said altered variable name; and
   in response to said HTTP request including said altered variable name, discover spam comments on said HTTP request,
   wherein the program code stored in the memory, when executed by the processor, causes the computer to:
   compare a variable name on said HTTP request to data stored on said form database; and
   scan said HTTP request for said spam comments if said variable name on said HTTP request is stored on said form database as said altered variable name.

6. The computer of claim 5, wherein the computer is a gateway.

7. The computer of claim 5, wherein the computer is an internet protocol server.

8. The computer of claim 5, wherein said HTTP response is intercepted by the computer before said web page with said form is received by said client.

9. The computer of claim 5, wherein the program code stored in the memory, when executed by the processor, causes the computer to integrate a set of anti-blam components on said web page.

10. The computer of claim 9, wherein said set of anti-blam components includes logic for asking a set of questions based on a set of displayed images.

11. The computer of claim 5, wherein the program code stored in the memory, when executed by the processor, causes the computer to delete data associated with said altered variable name from said form database when said altered variable name is replaced by said original variable name in said HTTP request.

* * * * *